United States Patent [19]

Howen

[11] Patent Number: 4,919,278
[45] Date of Patent: Apr. 24, 1990

[54] HOLDER FOR CONTAINERS AND COVERS

[76] Inventor: Phillip J. Howen, 2541 Crystal Dr., Joliet, Ill. 60435

[21] Appl. No.: 304,072

[22] Filed: Jan. 31, 1989

Related U.S. Application Data

[63] Continuation of Ser. No. 205,971, Jun. 13, 1988, abandoned.

[51] Int. Cl.$^5$ ............................................... A47F 7/00
[52] U.S. Cl. .................................... 211/49.1; 206/515
[58] Field of Search ................... 211/49.1, 59.1, 181, 211/50, 184; 206/515, 518

[56] References Cited

U.S. PATENT DOCUMENTS

| | | |
|---|---|---|
| 584,906 | 6/1897 | Tribolet . |
| 653,699 | 7/1900 | Robinson ........................... 211/49.1 |
| 1,500,767 | 7/1924 | Rice . |
| 1,501,477 | 7/1924 | Cunningham et al. . |
| 2,137,737 | 11/1938 | Wenzel . |
| 2,507,443 | 5/1950 | Hunt ............................... 211/133 X |
| 2,530,124 | 11/1950 | Kieckhefer ..................... 206/515 X |
| 2,621,807 | 12/1952 | Rendich ............................ 211/50 X |
| 3,165,234 | 1/1965 | Conklin et al. ................. 206/518 X |
| 3,463,353 | 8/1969 | Peebles ........................... 206/518 X |
| 3,856,472 | 12/1974 | Schweitzer et al. .................. 211/41 |
| 3,897,724 | 8/1975 | McDonald . |

Primary Examiner—Reinaldo P. Machado
Assistant Examiner—Sarah A. Lechok
Attorney, Agent, or Firm—Ernest Kettelson

[57] ABSTRACT

A holder for containers and covers, particularly for empty margarine containers and their covers or similar items, comprising a circular base and having a first set of positioning recesses for three retaining rods spaced apart arcuately a distance of one hundred twenty degrees centered on an outer concentric circle. A second set of positioning recesses is provided in the base, also spaced apart arcuately a distance of one hundred twenty degrees and centered on an inner concentric circle. This positioning of recesses at arcuate intervals of one hundred and twenty degrees of a circle makes it possible for only three retaining rods seated in such recesses to hold circular containers and their covers of substantially the same diameter as such circle within the holder and against lateral movement from the holder. The plurality of sets of three arcuately spaced positioning recesses makes it possible to use the holder for containers and covers of different size diameters. The three retaining rods seat snugly in the recesses but are manually removable. Thus they can be seated in positioning recesses centered on a large diameter circle for holding and stacking a collection of empty containers having a large diameter, and in those centered on a small diameter circle for collection of empty containers having a small diameter.

15 Claims, 8 Drawing Sheets

HOLDER FOR CONTAINERS AND COVERS

This application is a continuation of prior application Ser. No. 205,971 filed June 13, 1988, now abandoned.

BACKGROUND OF THE INVENTION

This invention relates to the field of holders for a stack of empty containers, particularly, of circular or annular peripheral configuration, including covers for such containers. In particular, the holder in accordance with this invention is for convenient storage of an accumulation of empty plastic margarine containers and covers, or containers and covers of similar kind in which other food products are sold. Such containers are useful for a variety of purposes after the margarine or other food product has been consumed, but there is need for a holder in which to keep such containers in an orderly and neat manner as they accumulate. The containers are not all of the same size diameter, and the purchaser does not known in advance what the diameter size is going to be of a particular kind of food or other container he decides to keep after the contents have been used. Therefore, the holder for this particular use should have retaining means which can be adjusted to accommodate the diametric dimension of different size containers. That is particularly important for a holder such as the present invention which utilizes the minimum number of retaining rods needed to hold circular objects against lateral movement, namely three of them spaced apart arcuately at one hundred and twenty degree intervals. They should seat fairly close to the rim of such circular objects. If they do not, the straight line distance between retaining rods spaced apart arcuately at one hundred twenty degree intervals becomes large enough for small diameter objects to slip through.

The invention as shown and described herein has two sets of three positioning recesses spaced apart arcuately at one hundred twenty degree intervals, one set centered on an outer concentric circle and the second on an inner concentric circle. Two of such sets of positioning recesses are generally adequate for ordinary household use, but any number of sets of recesses centered on any number of radially spaced apart concentric circle may be used.

While the holder in accordance with this invention has been developed particularly for orderly storage of empty margarine containers and their covers, and other food containers after the contents have been used up, it can be made in different sizes for orderly storage and accumulation of a variety of circular objects as small as coins and washers to as large as hub caps for cars and even larger. The features of using a minimum of three retaining rods at one hundred twenty degree intervals, positionable in recesses centered on a plurality of concentric circles of different size diameters, makes this invention adaptable for many different uses where orderly storage of a collection of circular objects is desired.

None of the prior art holders for objects of the type mentioned which are known to the inventor include such features. Prior art holders in this general category are disclosed and described in the following United States patents.

U.S. Pat. No. 4,611,718 discloses a device for storing a plurality of dishes or the like in a plurality of stacks. It includes angularly shaped uprights having a general shape and dimension conforming to that of plates and other dishes stacked therebetween, and divider panels to separate into compartments for a plurality of stacks.

U.S. Pat. No. 3,168,229 discloses a plate holder comprising a wire frame that has five upright rods supporting and connected to three vertically spaced apart arcuate rods, a circular base having two concentric rings supported by six spokes extending from a central hub, and having a handle at the top for carrying.

U.S. Pat. No. 2,544,053 discloses a dish holder having an elongated cavity for a stack of dishes bounded by a plurality of elongated relatively broad retaining strips secured at each end to an end wall.

U.S. Pat. No. 2,538,612 discloses a bakery cake tin rack comprising a wire frame having six arcuately spaced apart elongated rods connected at each end to a ring member, the bottom ring having a pair of crossbars and a handle connected to the top ring, and a third ring midway between each end connected to support the six arcuately spaced elongated rods.

U.S. Pat. No. 2,307,241 discloses a portable cup assembly comprising a C-shaped frame, in which the bottom leg of the C provides a base for saucers having a cross-leg with an upright at each end, the top leg of the C provides a handle to carry the unit, and a hanger rod extends below the top leg of the C and roughly parallel thereto on which cups are hung by the hanger rod extending through the cup handles.

U.S. Pat. No. 1989,841 discloses a dish rack having a pair of spaced apart horizontal bars covered with a flexible material such as rubber to support dishes thereon for rinsing and the like, the horizontal support bars being conntected at each end to upright end walls.

U.S. Pat. No. 1,952,457 discloses a rack for baking tins and the like comprising a wire frame having six elongated rods spaced apart arcuately, connected to an ovular ring at each end and to three intermediate spaced apart arcuate rods between each end.

U.S. Pat. No. 1,127,319 discloses a rack or holder for poker chips and a drawer for the cards. The rack comprises a rectangular base having four spaced apart upright posts along one long edge and four also spaced apart along the opposite long edge, with a handle extending upwardly midway between the two rows of posts and a single upright post between the two legs of the handle.

U.S. Pat. No. 584,906 discloses a hat displayer comprising four spaced apart upright rods having an L-bend at their lower end, the horizontal leg of each rod extending inwardly toward a two part base member which has four recesses in the bottom part to receive the horizontal leg of each rod and which includes a top cover part screwed to the bottom part to hold the horizontal legs of the rods in place. The horizontal legs of each rod terminate in a right-angle bend which bears against the top cover apart when put in place to thereby hold the vertical leg of each rod in the upright position.

SUMMARY OF THE INVENTION

It is an object of the invention to provide a holder for a collection of objects having a generally annular peripheral configurations to keep them in an orderly manner as accumulated, comprising a base and a minimum number of three retaining members extending from the base and spaced apart arcuately thereon a distance of one hundred twenty degrees in positioning recesses formed in the base centered on the circumference of a circle which if drawn would bisect such recesses.

It is an object of the invention to provide a holder for a collection of objects having a generally annular peripheral configuration to keep them in an orderly manner, comprising a base, a first plurality of arcuately spaced apart positioning recesses formed in the base centered on the circumference of a first concentric circle and additional pluralities of arcuately spaced apart positioning recesses formed in the base centered on the circumference of respective ones of a plurality of additional concentric circles, and elongated retaining rods to seat in such recesses of respective ones of said concentric circles, whereby the retaining space bounded by such retaining rods can be adjusted to accommodate different diameter sizes of collections of objects for which the holder is to be used.

It is an object of the invention to provide a holder for a collection of empty margarine containers and their covers, or other product containers after the contents have been removed, to keep them in an orderly manner, comprising a base having a first set of three recesses arcuately spaced apart one hundred and twenty degrees in a first concentric circular row, a second set of three recesses arcuately spaced apart one hundred and twenty degrees in a second concentric circular row having a diameter smaller than that of said first concentric circular row, and three elongated retaining rods which can be seated in and removed from such recesses of respective ones of said first and second concentric circular rows.

DESCRIPTION OF THE PREFERRED EMBODIMENT

Figure 1:
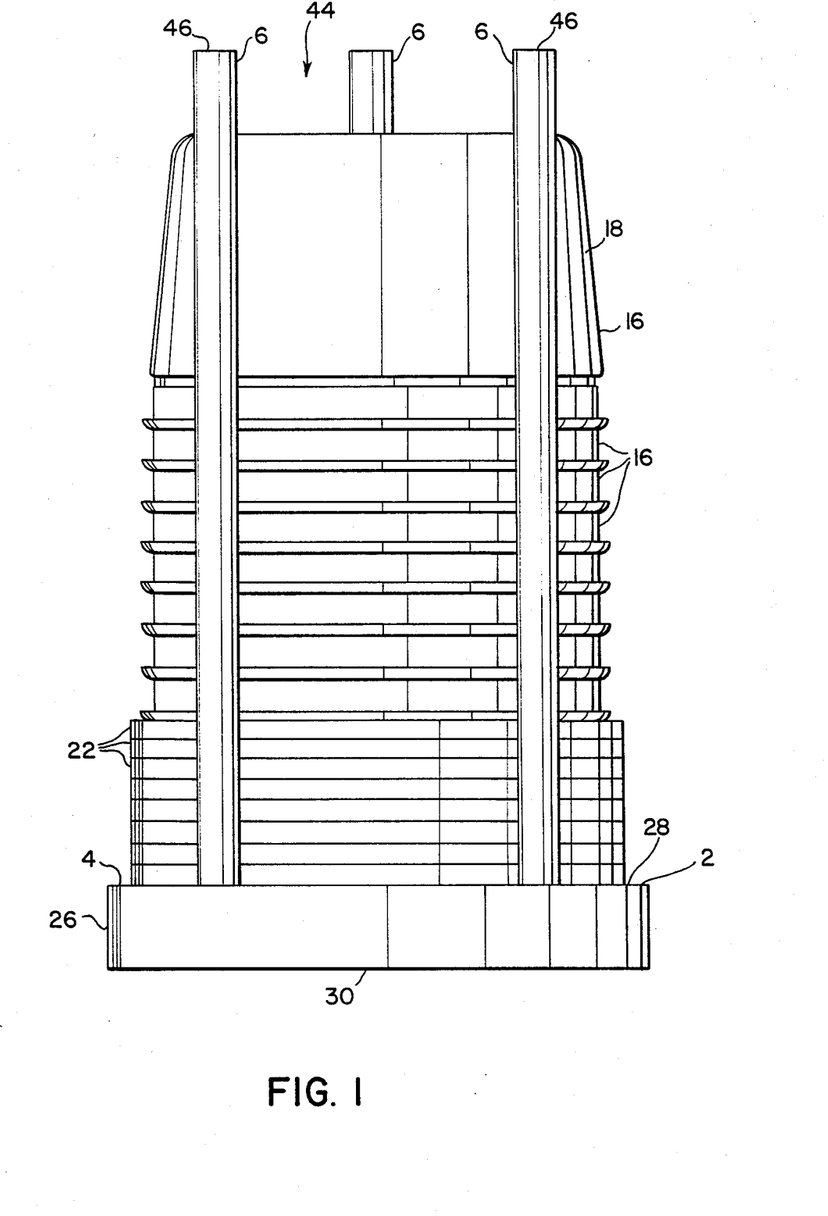
FIG. 1 is a side elevation view of a holder for empty margarine containers and their covers, or for similar items, showing a plurality of such containers and their covers stacked and held therein.
Figure 2:
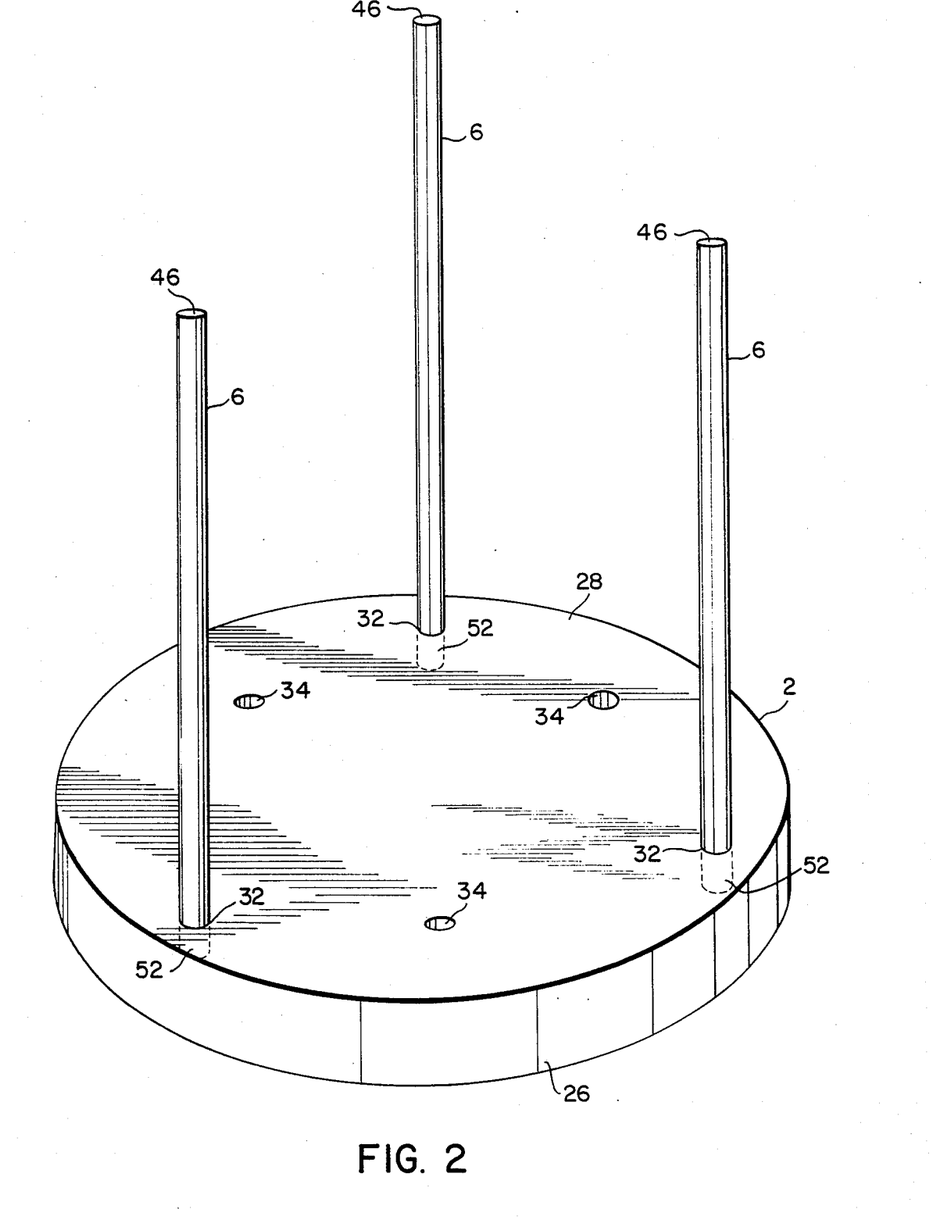
FIG. 2 is a perspective view of a holder for containers and covers in accordance with this invention showing the retaining rods seated in the outer set of arcuately spaced apart positioning recesses.

A holder 2 for empty margarine containers and their covers, or for similar items, in accordance with this invention includes a base 4 and three retaining rods 6 extending upwardly from the base 4 at spaced apart locations to define a container retention space 8 bounded by the retaining rods 6.

Figure 4:
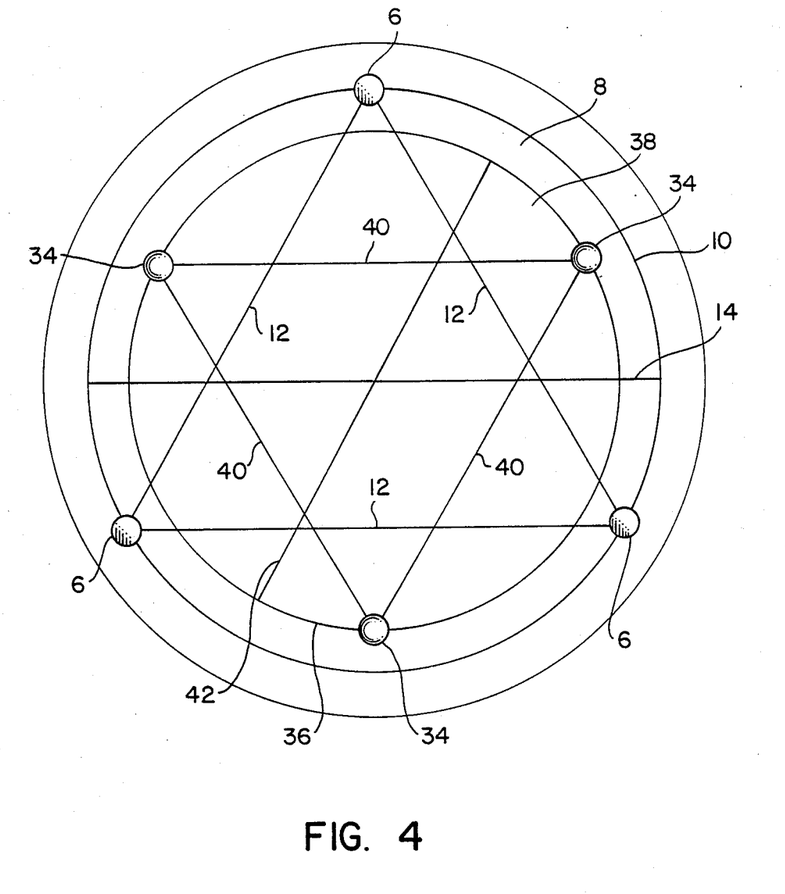
FIG. 4 is a diagrammatic plan view of the base of the holder shown in FIG. 3 in which the concentric circle lines have been drawn on which the two respective sets of positioning recesses are centered, and in which the straight lines between the recesses in each set have been drawn as well as the diameter of the concentric circles, the retaining rods shown seated in the positioning recesses on the outer concentric circle.
Figure 5:
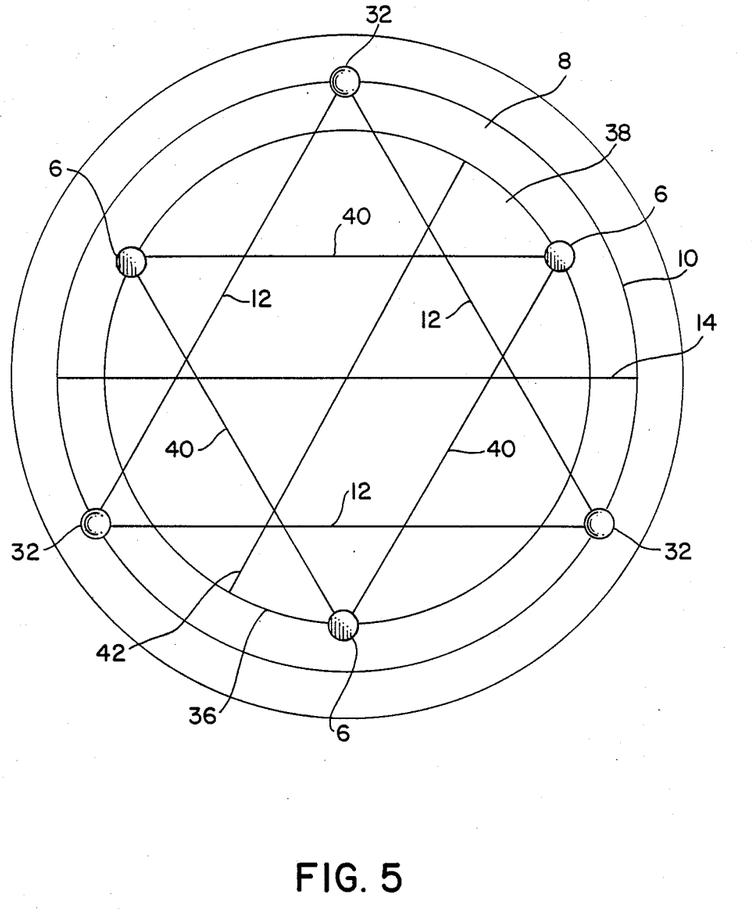
FIG. 5 is a diagrammatic plan view similar to FIG. 4 but showing the retaining rods seated in the positioning recesses centered on the inner concentric circle.

The retaining rods 6 are spaced apart a substantially equal distance, one from the other. In a circle 10 through the center of each retaining rod 6, each rod 6 is arcuately spaced apart from the other two retaining rods 6 an arcuate distance of substantially one hundred and twenty degrees. The straight line distance 12 between each rod 6 is less than the diameter 14 of the circle 10, whereby containers 16 having a substantially circular peripheral wall 18 and a diameter 20 substantially equal to the diameter 14 of the circle 10 will be held against lateral movement within the container retention space 8 by the three retention rods 6 placed in such spaced apart locations.

Figure 6:
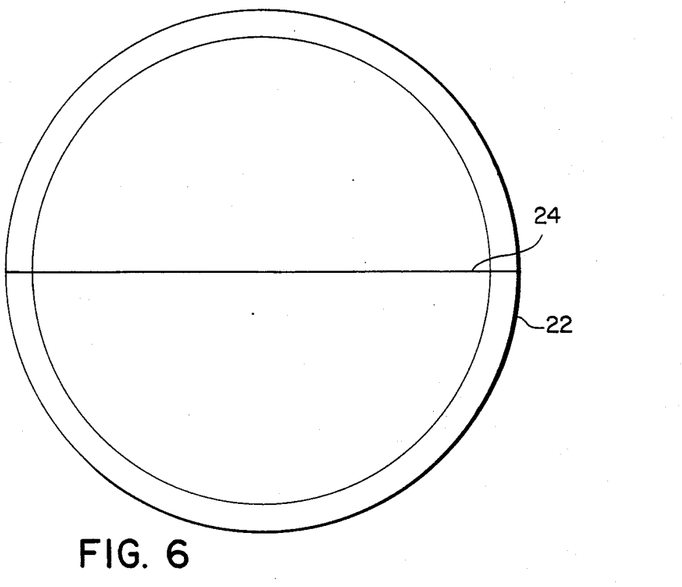
FIG. 6 is a plan view of a circular cover of the kind that may be held in the holder in accordance with this invention, showing a line indicating the diameter of the cover.
Figure 7:
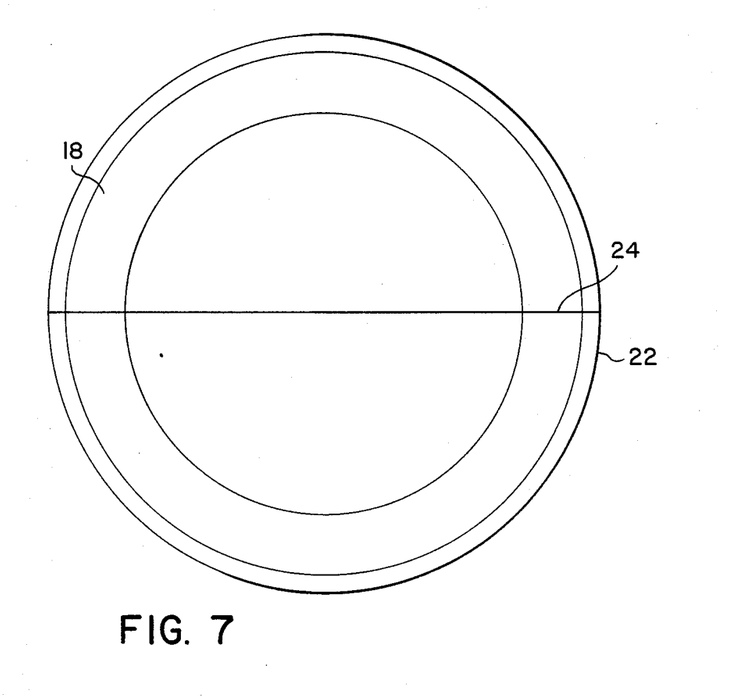
FIG. 7 is a plan view of an empty margarine container that may be held in the holder in accordance with this invention, showing a line indicating the diameter of the container.

Circular covers 22 for the container 16 and having a diameter 24 substantially the same as the diameter 20 of the container 16 may also be placed in he container retention space 8 and held therein against lateral movement by the three retention rods 6.

Figure 3:
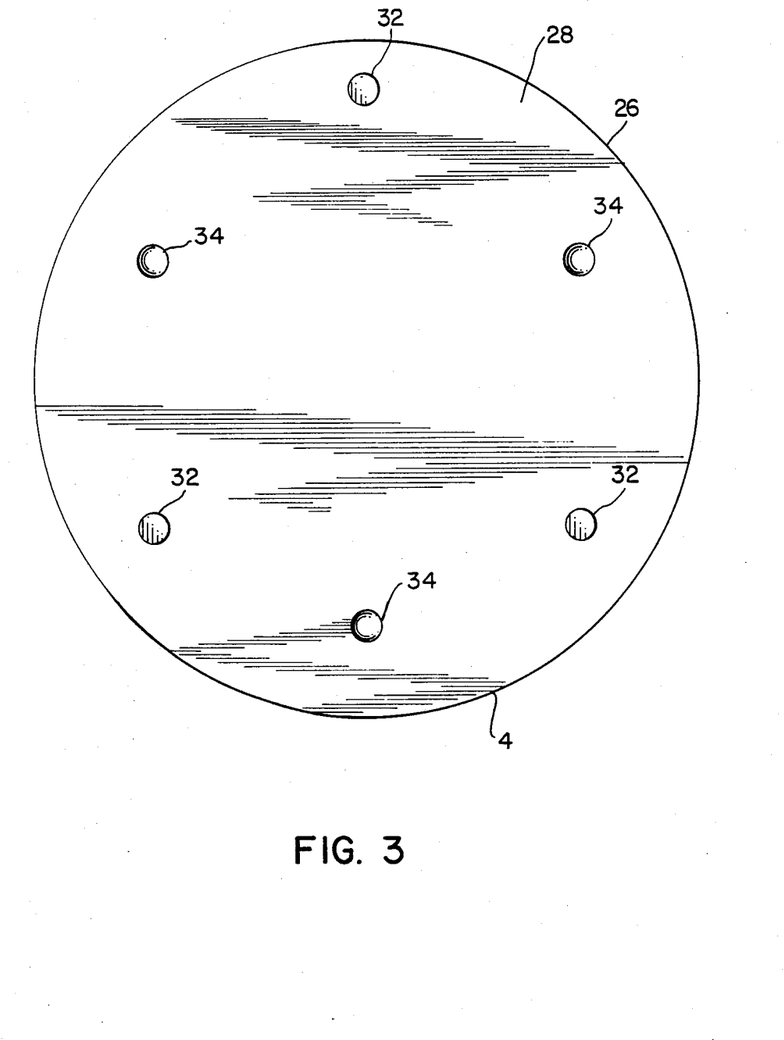
FIG. 3 is a plan view of the base of the holder showing the two sets of arcuately spaced apart positioning recesses whose respective centers lies on concentric circles.

The base 4 has a peripheral wall 26, an upwardly facing planar surface 28 and a bottom planar surface 30. A first set of three positioning recesses 32 is provided in the base 4 in which the retaining rods 6 may be seated and removed. The recesses 32 open to the upwardly facing surface 28 of the base 4, and are centered on the circle 10. Each recesses 32 is arcuately spaced apart from the other two recesses 32 an arcuate distance of substantially one hundred and twenty degrees. The straight line distance 12 between each recess 32 is less than the diameter 14 of the circle 10.

A second set of three positioning recesses 34 may also be provided in the base 3 in which the retaining rods 6 may be seated and removed. This second set of recesses 34 are centered on a smaller diameter circle 36 concentric with circle 10 and spaced apart radially inwardly thereof to define a second and smaller container retention space 38 for containers and covers of corresponding smaller diameter. The recesses 34 open to the upwardly facing surface 28 of the base 4. Each recess 34 is arcuately spaced apart from the other two recesses 34 an arcuate distance of substantially one hundred and twenty degrees. The straight line distance 40 between each recess 34 is less than the diameter 42 of the circle 36. Thus, when the three retaining rods 6 are seated in the three positioning recesses 34 of the second set, circular wall containers and covers having a diameter corresponding to that of the diameter 42 of the smaller circle 36 will be held against lateral movement within the second and smaller container retention space 38.

The cross-sectional configuration of the retaining rods 6 and positioning recesses 32 and 34 is preferrably circular, but may be of other configurations including ovular and angular. The cross-sectional dimension of the positioning recesses 32 and 34 correspond to that of the retaining rods 6 to provide a snug fit when the rods 6 are inserted therein but from which they may be manually removed either for repositioning from one set of recesses to the other for use with different size containers and covers or to disassemble for storage.

Figure 9:
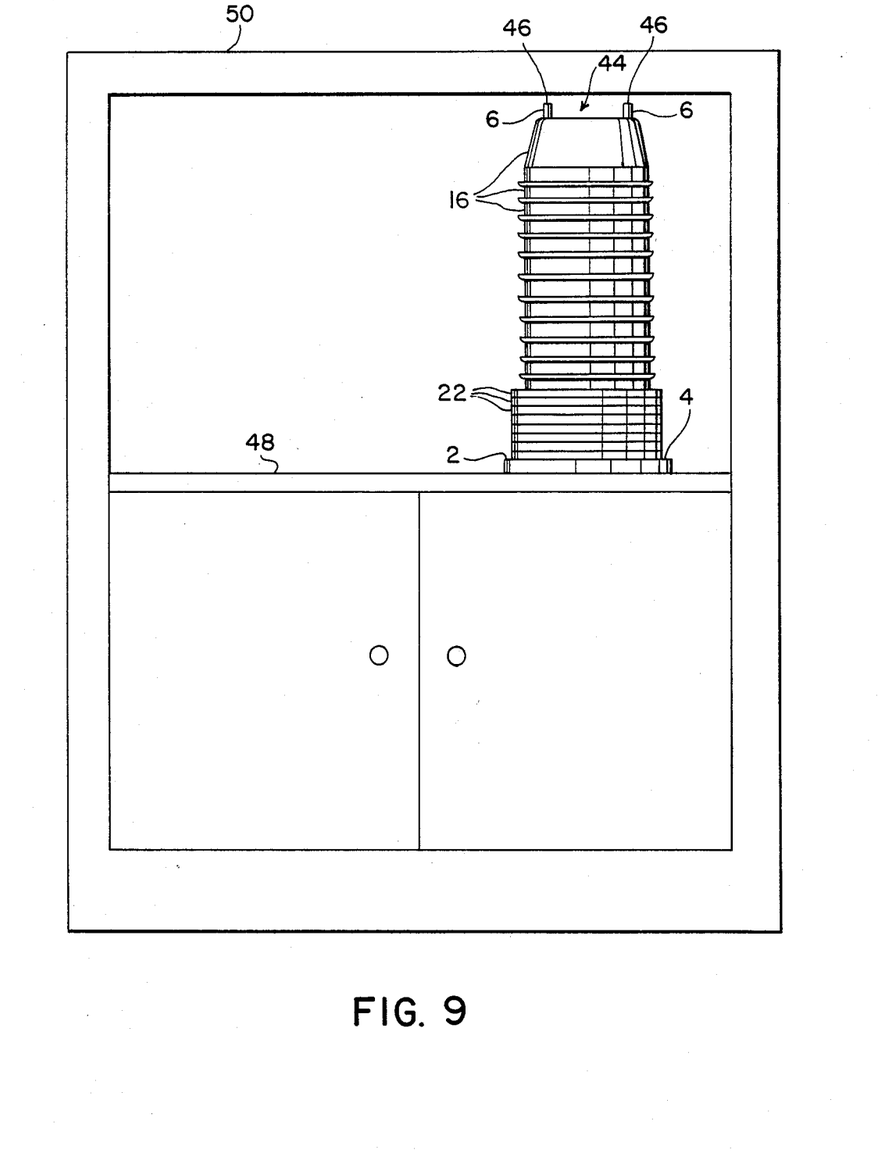
FIG. 9 is a side elevation view of the cabinet, shelf and holder of FIG. 8 but with one of the retaining rods removed from its positioning recess to enable lateral withdrawal of a container or the entire stack from the holder.

Also, any one of the retaining rods 6 may be removed from its positioning recess 32 or 34 which provides a wide enough opening to move containers 16 and covers 22 laterally from the container retention spaces 8 and 38, or laterally into such container retention spaces. This feature makes it possible to have a holder for a very high stack of containers and covers, in which it would be difficult, inconvenient or impractical to lift the entire stack or individual containers out from the top 44 over the outer ends 36 of the retaining rods 6.

Figure 8:
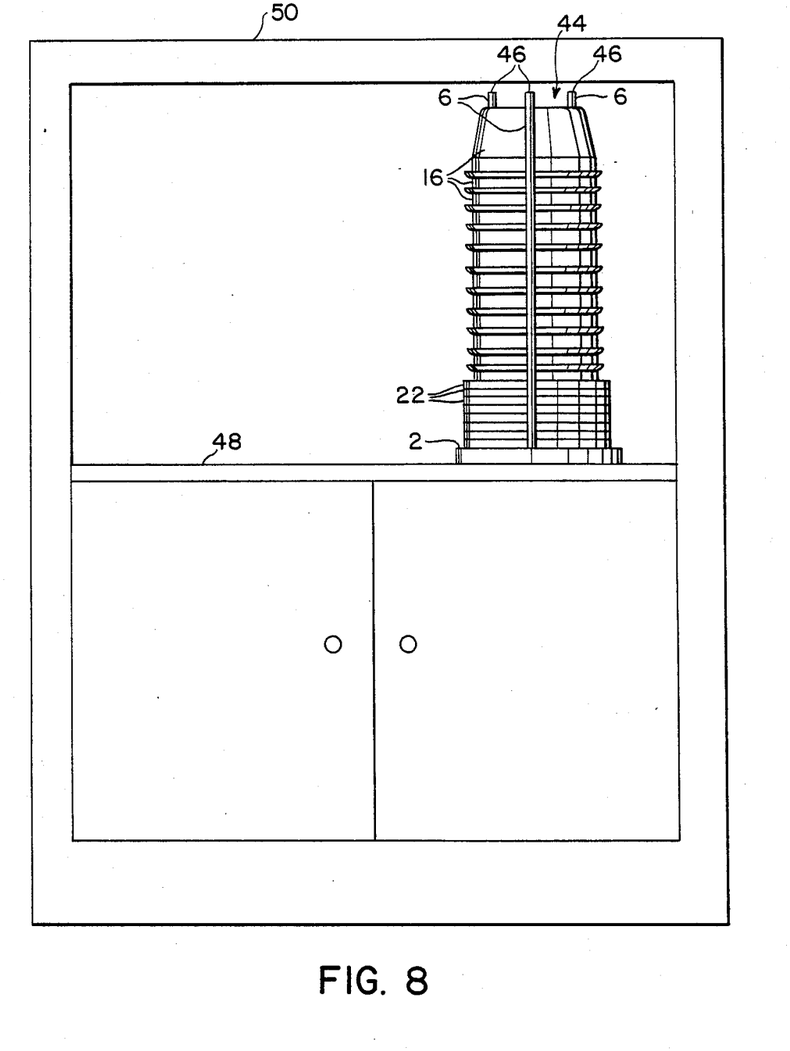
FIG. 8 is a side elevation view of a cabinet having a shelf and a holder in accordance with this invention on the shelf having containers and covers stacked therein, this figure showing all three retaining rods in place, the cabinet having insufficient clearance for removal of a container or the entire stack from the top of the holder.

This feature also makes it possible to place the holder 2 of this invention on the shelf 48 of the cabinet 50 in which there is insufficient clearance above the top 44 and the outer ends 46 of the retaining rods 6 to lift the containers and covers out that way. The lower ends 52 of the retaining rods 6 seat in the positioning recesses 32 and 34 a relatively short distance of about a quarter inch to a half inch or more depending on the size of the holder 2 and of the containers 16 and covers 22 with which the holder is to be used. Thus, even if there is only a corresponding quarter inch to half inch or more of clearance above the outer ends 46 of the retaining rods 6, one of them can be raised that much to remove from its positioning recess. The stack of containers 16 and covers 22, or individual ones can then be moved laterally out of or into the container retention spaces 8 and 38 while the holder 2 remains in place on the shelf 48 of the cabinet 50.

This invention may also be incorporated in a very tall holder 2 for use in the kitchen of a restaurant or other commercial establishment wherein it may extend from the floor almost to the ceiling. Circular containers 16 and covers 22 may be stacked therein from the floor to the ceiling and individually removed or inserted laterally by removing one of the retaining rods 6.

This invention may be used to hold various types of circular plates, saucers, cups and the like, but is particularly adapted to store collections of empty plastic margarine containers and their covers.

The parts of the holder 2, including the base 4 and the retaining rods 6 may be made of wood as well as various plastic materials and metal.

The peripheral configuration of the base 4 is preferrably circular, but it can be in other shapes including ovular and angular. The retaining rods 6 and positioning recesses 32 and 34 are also preferrably circular but may be of other cross-sectional configurations including ovular and angular. The retaining rods 6 are insertable into and removable from the positioning recesses 32 and 34 and are held firmly in the recesses until removed by friction as a result of a snug, close tolerance fit. Other means may be used to removably retain the retaining rods in the recesses including screw threads, a projecting lug and locking groove arrangement, a ball and socket combination and other types of removably retainable connecting means.

The items the holder 2 may be used for are preferrably circular or have a peripheral configuration that extends around a central axis at approximately the same radial distance from the central axis throughout. However, the holder 2 may be used to hold any item against lateral movement into and out of the holder that will fit within the space defined by the three retaining rods 6 when seated in the recesses 32 and 34 respectively, a portion of which has a cross-sectional dimension greater than the straight line distance 12 between recesses 32 or the straight line distance 40 between recesses 34, respectively.

I claim:

1. The combination of a holder for empty food containers, empty food containers stacked therein, and covers for said empty food containers also stacked therein, in which each empty food container has a first peripheral dimension and a first cross-sectional dimension at its widest point, said covers having a cross-sectional dimension corresponding to that of said food containers at said widest point to be received on said food containers, said holder comprising a base, a first upwardly extending retaining member positioned on said base at a first base position, a second upwardly extending retaining member positioned on said base at a second base position, and a third upwardly extending retaining member positioned on said base at a third base position, including said first, second and third base positions, said first, second and third upwardly extending retaining members in said first, second and third base position being spaced apart a sufficient distance to receive at least a first one of said empty food containers having said first peripheral dimension and a first one of said covers therebetween, the distances between said first base position and said second base position, between said first base position and said third base position, and between said second base position and said third base position each respectively being smaller than said first cross-sectional dimension of said each empty food container and cover therefore, including said empty food containers stored in nesting relationship and said covers therefore stored in stacking relationship in said holder.

2. The combination of a holder for empty food containers, empty food containers stacked therein, and covers for said empty food containers also stacked therein, as set forth in claim 1, wherein said first base position, said second base position and said third base position lie in a circular path, including said empty food containers stored in nesting relationship and said covers therefore stored ins tacking relationship in said holder.

3. The combination of a holder for empty food containers, empty food containers stacked therein, and cover for said empty food containers also stacked therein, as set forth in claim 1, wherein said first base position, said second base position and said third base position are each spaced apart from each of the others a substantially equal distance, including said empty food containers stored in nesting relationship and said covers therefore stored in stacking relationship in said holder.

4. The combination of a holder for empty food containers, empty food containers stacked therein, and covers for said empty food containers also stacked therein, as set forth in claim 1, wherein said first base position, said second base position and said third base position lie in a circular path, each of said positions being arcuately spaced apart from each of the others an arcuate distance of substantially one hundred twenty degrees around said circular path, including said empty food containers stored in nesting relationship and said covers therefore stored in stacking relationship in said holder.

5. The combination of a holder for empty food containers, empty food containers stacked therein, and covers for said empty food containers also stacked therein, in which each empty food container has a first peripheral dimension and a first cross-sectional dimension at its widest point, said holder comprising a base, a first positioning means on said base at a first base position, a second positioning means on said base at a second base position, and a third positioning means on said base at a third base position, said first, second and third positioning means lying in a first circular path, said first, second and third positioning means being spaced apart a sufficient distance to receive at least a first one of said empty food containers having said first peripheral dimension therebetween, the distances between said first positioning means and said second positioning means, between said first positioning means and said second positioning means and between said second positioning means and said third positioning means each respectively being smaller than said first cross-sectional dimension of said each empty food container and cover therefore, a fourth positioning means on said base at a fourth base position, a fifth positioning means on said base at a fifth base position, and a sixth positioning means on said base at a sixth base position, said fourth, fifth and sixth positioning means lying in a second circular path, said second circular path having a different diametric dimension than said first circular path, said positioning means being provided to position elongated members on said base to extend upwardly therefrom, including a first elongated member receivable by at least one of said positioning means, a second elongated member receivable by at least one of said positioning means and a third elongated member receivable by at least one of said positioning means, including said empty food containers stored in nesting relationship and said covers therefore stored in stacking relationship in said holder.

6. The combination of a holder for empty food containers, empty food containers stacked therein, and covers for said empty food containers also stacked therein, as set forth in claim 5, wherein said first elongated member is receivable by said first positioning means and at least one of said fourth, fifth and sixth positioning means, said second elongated member is receivable by said second positioning means and at least one of said fourth, fifth and sixth positioning means, and said third elongated member is receivable by said third positioning means and at least one of said fourth, fifth and sixth positioning means, including said empty food containers stored in nesting relationship and said covers therefore stored in stacking relationship in said holder.

7. The combination of a holder for empty food containers, empty food containers stacked therein, and covers for said empty food containers also stacked therein, as set forth in claim 5, wherein said positioning means comprise recesses in said base having a cross-sectional configuration and dimension corresponding to that of said elongated members to snugly receive respective ones of them therein, including said empty food containers stored in nesting relationship and said covers therefore stored in stacking relationship in said holder.

8. The combination of a holder for empty food containers, empty food containers also stacked therein, as set forth in claim 5, wherein said fourth, fifth and sixth positioning means are spaced apart each from the other, a substantially equal distance, including said empty food containers stored in nesting relationship and said covers therefore stored in stacking relationship in said holder.

9. The combination of a holder for empty food containers, empty food containers stacked therein, and covers for said empty food containers also stacked therein, as set forth in claim 5, wherein said first, second and third positioning means are spaced apart each from the other, a substantially equal distance, including said empty food containers stored in nesting relationship and said covers therefore stored in stacking relationship in said holder.

10. The combination of a holder for empty food containers, empty food containers stacked therein, and covers for said empty food containers also stacked therein, as set forth in claim 5, wherein said first, second and third positioning means lying in said first circular path are each spaced apart from the other an arcuate distance of substantially one hundred twenty degrees, and said fourth, fifth and sixth positioning means lying in said second circular path are each spaced apart from the other an arcuate distance of substantially one hundred twenty degrees, including said empty food containers stored in nesting relationship and said covers therefore stored in stacking relationship in said holder.

11. The combination of a holder for empty food containers, empty food containers stacked therein, and covers for said empty food containers also stacked therein, as set forth in claim 5, wherein said first circular path and said second circular path are concentric, including said empty food containers stored in nesting relationship and said covers therefore stored in stacking relationship in said holder.

12. The combination of a holder for empty food containers, empty food containers stacked therein, and covers for said empty food containers also stacked therein, as set forth in claim 5, wherein said base comprises a solid body portion having a peripheral wall spaced apart throughout from the central axis of said body portion a distance at least as great as that of the radius of the larger of said first and second circular paths, an upwardly facing planar surface, said elongated members extending upwardly from said upwardly facing planar surface when received by respective ones of said positioning means, said upwardly facing planar surface extending continuously throughout at least that portion of said base within said first and second circular paths in which said respective ones of said positioning means lie, to provide a continuous planar surface to receive said empty food containers thereon, including said empty food containers stored in nesting relationship and said covers therefore stored in stacking relationship in said holder.

13. The combination of a holder for empty food containers, empty food containers stacked therein, and covers for said empty food containers also stacked therein, said holder comprising base, a first positioning means on said base at a first base position, a second positioning means on said base at a second base position, and a third positioning means on said base at a third base position, said first, second and third positioning means are each spaced apart from the other a substantially equal distance, said positioning means being provided to position elongated members on said base to extend upwardly therefrom, including a first elongated member receivable by at lest one of said positioning means, a second elongated member receivable by at least one of said positioning means and a third elongated member receivable by at least one of said positioning means, at least one of said elongated members being releasably receiveable by one of said positioning means for removal of said one of said elongated members from said base to permit lateral movement of said empty food containers away from said base and on to said base, including said empty food containers stored in nesting relationship and said covers therefore stored in stacking relationship in said holder.

14. The combination of a holder for empty food containers, empty food containers stacked therein, and covers for said empty food containers also stacked therein, as set forth in 13, wherein said first, second and third positioning means lie in a first circular path, said base including a fourth positioning means at a fourth base position, a fifth positioning means at a fifth base position and a sixth positioning means at a sixth base position, said fourth, fifth and sixth positioning means each being spaced apart from the other a substantially equal distance, said fourth, fifth and sixth positioning means lying in a second circular path, said second circular path having a different diametric dimension than said first circular path, said fourth, fifth and sixth positioning means being adapted to position respective ones of said elongated members on said base when received thereby, including said empty food containers stored in nesting relationship and said covers therefore stored in stacking relationship in said holder.

15. The combination of a holder for empty food containers, empty food containers stacked therein, and covers for said empty food containers also stacked therein, as set forth in claim 14, wherein said first and second circular paths are concentric, including said empty food containers stored in nesting relationship and said covers therefore stored in stacking relationship in said holder.

* * * * *